(12) United States Patent
Lin

(10) Patent No.: US 7,063,009 B2
(45) Date of Patent: Jun. 20, 2006

(54) SAFETY DEVICE OF A JUICE EXTRACTOR

(76) Inventor: Kuan-Chih Lin, c/o PMB#1008, 1867 Ygnacio Valley Rd., Walnut Creek, CA (US) 94598

( * ) Notice: Subject to any disclaimer, the term of this patent is extended or adjusted under 35 U.S.C. 154(b) by 142 days.

(21) Appl. No.: 10/989,331

(22) Filed: Nov. 17, 2004

(65) Prior Publication Data

US 2006/0102018 A1    May 18, 2006

(51) Int. Cl.
*A23L 1/00* (2006.01)
*A23N 1/00* (2006.01)
*A47J 43/06* (2006.01)
*A47J 43/07* (2006.01)
*B02C 19/12* (2006.01)

(52) U.S. Cl. .......................... 99/492; 99/348; 99/510; 366/314; 366/601

(58) Field of Classification Search .................. 99/348, 99/509–513, 485, 495, 467, 492; 366/205, 366/206, 96–98, 197, 199, 314, 315, 342, 366/343, 307, 309; 241/282.1, 282.2, 282.5, 241/292.1, 97, 46, 17, 98, 199.12, 37.5, 92, 241/285.1, 285.2; 403/330, 206
See application file for complete search history.

(56) References Cited

U.S. PATENT DOCUMENTS

| | | | | | |
|---|---|---|---|---|---|
| 2,940,738 | A | * | 6/1960 | Posener et al. | ............. 366/205 |
| 5,584,577 | A | * | 12/1996 | Thies | ........................... 366/205 |
| 5,662,032 | A | * | 9/1997 | Baratta | ......................... 99/513 |
| 5,809,872 | A | * | 9/1998 | Sundquist | .................... 99/492 |
| 6,135,019 | A | * | 10/2000 | Chou | ........................... 99/513 |
| 6,189,441 | B1 | * | 2/2001 | Beaudet et al. | ............... 99/492 |
| 6,523,993 | B1 | * | 2/2003 | Williams et al. | ............ 366/197 |
| 6,527,433 | B1 | * | 3/2003 | Daniels, Jr. | ................. 366/205 |
| 6,595,121 | B1 | * | 7/2003 | Chang Chien | ............... 99/510 |
| 6,632,013 | B1 | * | 10/2003 | Wulf et al. | .................. 366/199 |
| 6,666,574 | B1 | * | 12/2003 | Pryor | ........................... 366/205 |
| 6,837,153 | B1 | * | 1/2005 | Chang Chien | ............... 99/510 |
| 6,854,876 | B1 | * | 2/2005 | Dickson, Jr. | ................. 366/205 |

* cited by examiner

*Primary Examiner*—Timothy F. Simone
(74) *Attorney, Agent, or Firm*—Leong C. Lei

(57) ABSTRACT

A safety device of a juice extractor is disclosed. The juice extractor comprises an extractor body, a motor, a cup seat having a holding rib at one side of the cup seat and the holding rib containing a triggering member, and the bottom end of the cup seat being screwed to the top holding seat and the bottom end of the cup seat screwed to the cup body, characterized in that the protruded edge of the top holding seat is a slot to connect the cup body to the cup seat, and is then connected to the top holding seat, then the triggering member mounted at the cup seat can slide at the bottom section of the slot so as to depress the connection shaft, thereby by the safety of the juice extractor is improved.

2 Claims, 8 Drawing Sheets

SAFETY DEVICE OF A JUICE EXTRACTOR

BACKGROUND OF THE INVENTION (a) Technical Field of the Invention

The present invention relates to a safety device, and in particular, to a safety device of a juice extractor, which improves the safety of operating the juice extractor.

(b) Description of the Prior Art

FIGS. 1 and 2 show a conventional juice extractor comprising a base seat 1 and a cup body 2. A micro switch 134 operates the motor 112, and a press switch 113 is located at the lower side of a rib post 111. When the press switch 113 is depressed, current passes through the motor and the juice extractor is in operation. Referring to FIG. 3, a press rod 13 is depressed by the protruded rim 21 of the cup body 2. When the press rod 13 has not been depressed to touch the micro switch 134, the depression of the press switch 113 will not cause the motor 112 to operate. Thus, the feature provides a safety to the juice extractor. However, as shown in FIG. 4, before cup body 2 touches the holding seat 121 the recessed face at the inner side of the wall body 111 is a recess and thus the press shaft 13 is a protruded structure and if the finger of the user is at the holding seat 121 and the press shaft 13 is depressed. The motor 112 will drive the blade 122 to rotate and it may injure the user accidentally.

SUMMARY OF THE INVENTION

Accordingly, it is an object of the present invention to provide a safety device of a juice extractor comprising an extractor body, a motor, a cup seat having a holding rib at one side of the cup seat and the holding rib containing a triggering member, and the bottom end of the cup seat being screwed to the top holding seat and the bottom end of the cup seat screwed to the cup body, characterized in that the protruded edge of the top holding seat is a slot to connect the cup body to the cup seat, and is then connected to the top holding seat, then the triggering member mounted at the cup seat can slide at the bottom section of the slot so as to depress the connection shaft, thereby by the safety of the juice extractor is improved.

Still another object of the present invention is to provide a safety device of a juice extractor, wherein the cup body and the cup seat have to be connected and the rim wall causes the triggering section to be depressed so that the triggering section can slide into the bottom section of the slot so as to depress the connection shaft.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
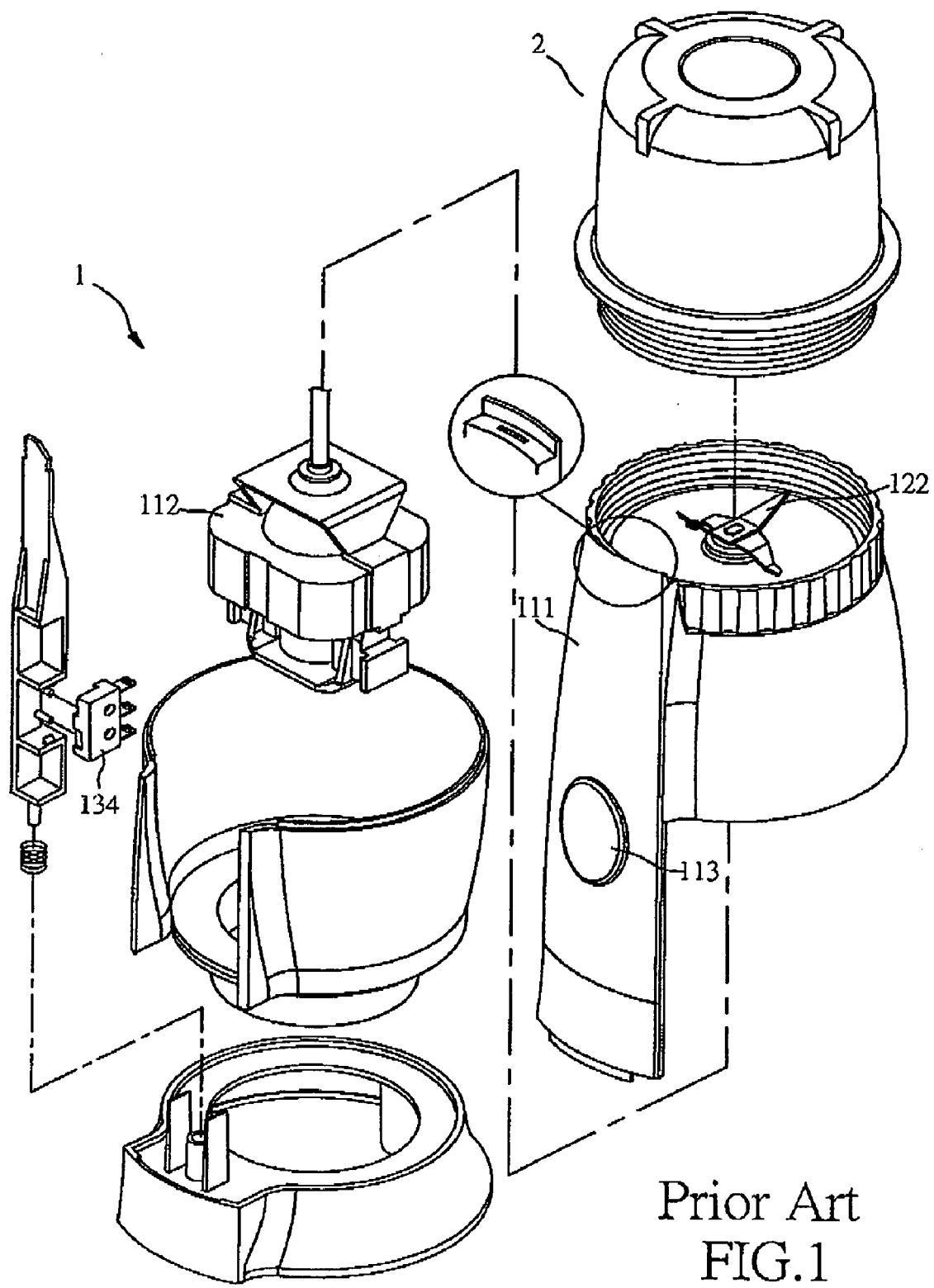
FIG. 1 is a perspective exploded view of a conventional juice extractor.
Figure 2:
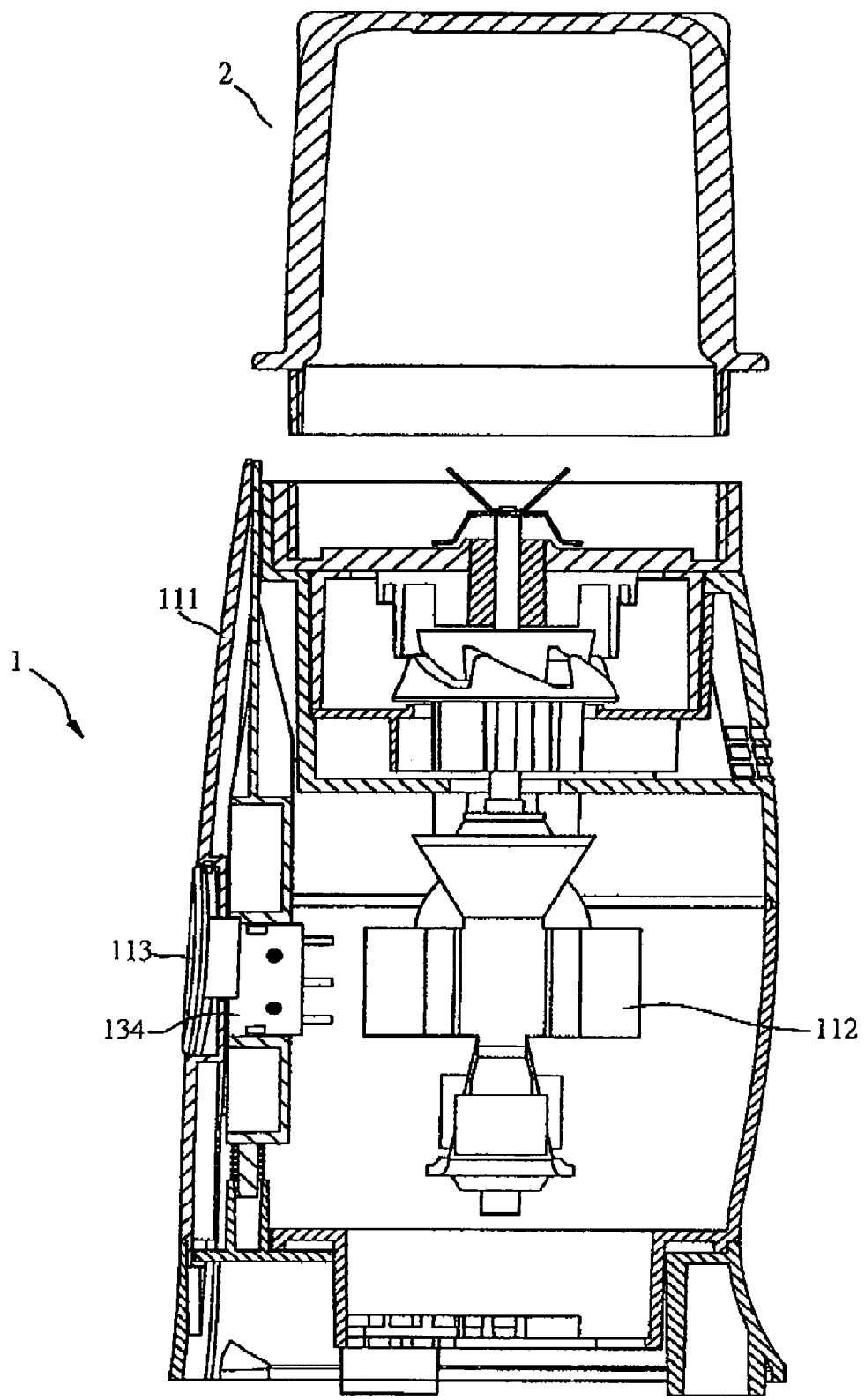
FIGS. 2 and 3 are schematic views showing the action of the conventional juice extractor.
Figure 3:
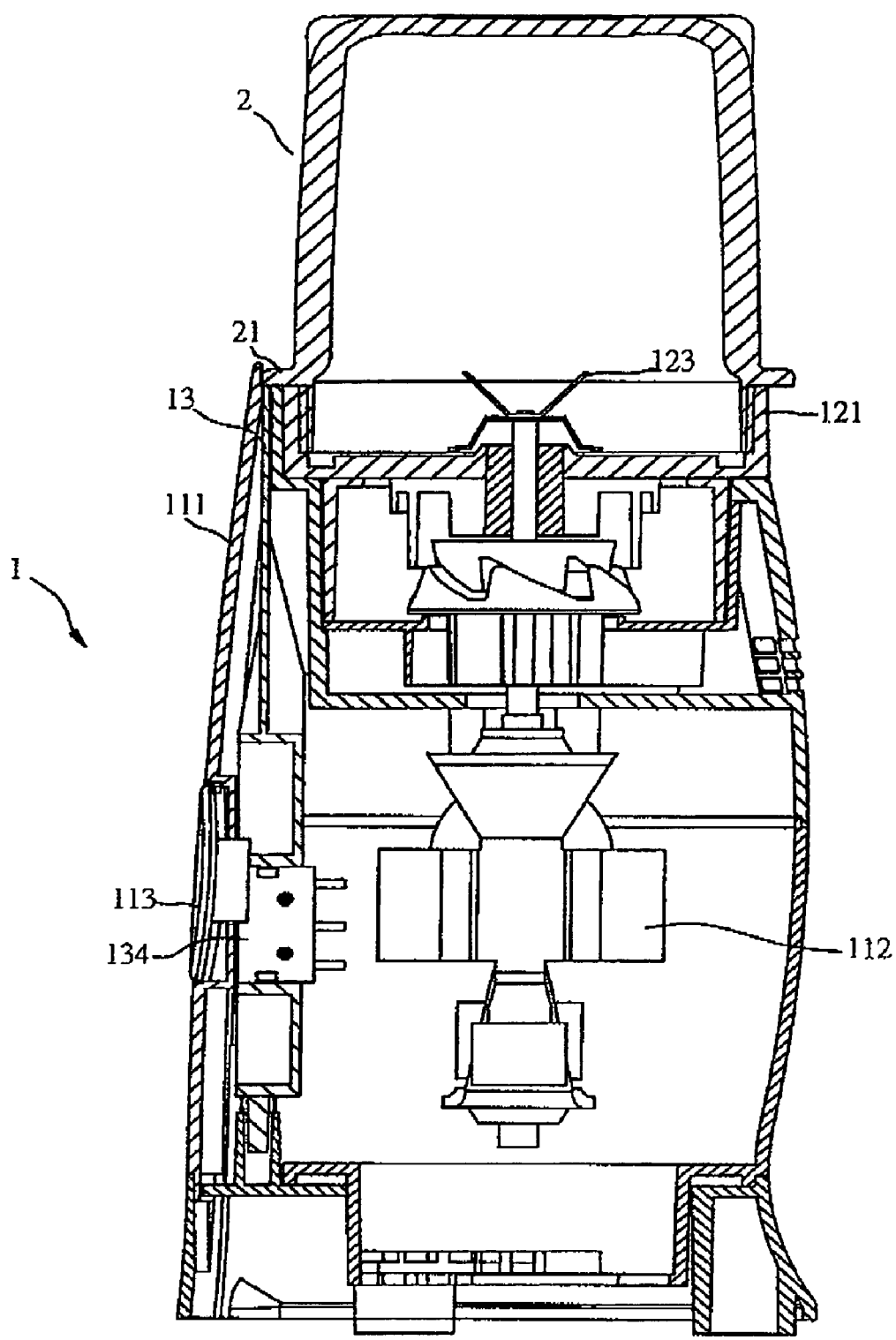
Figure 4:
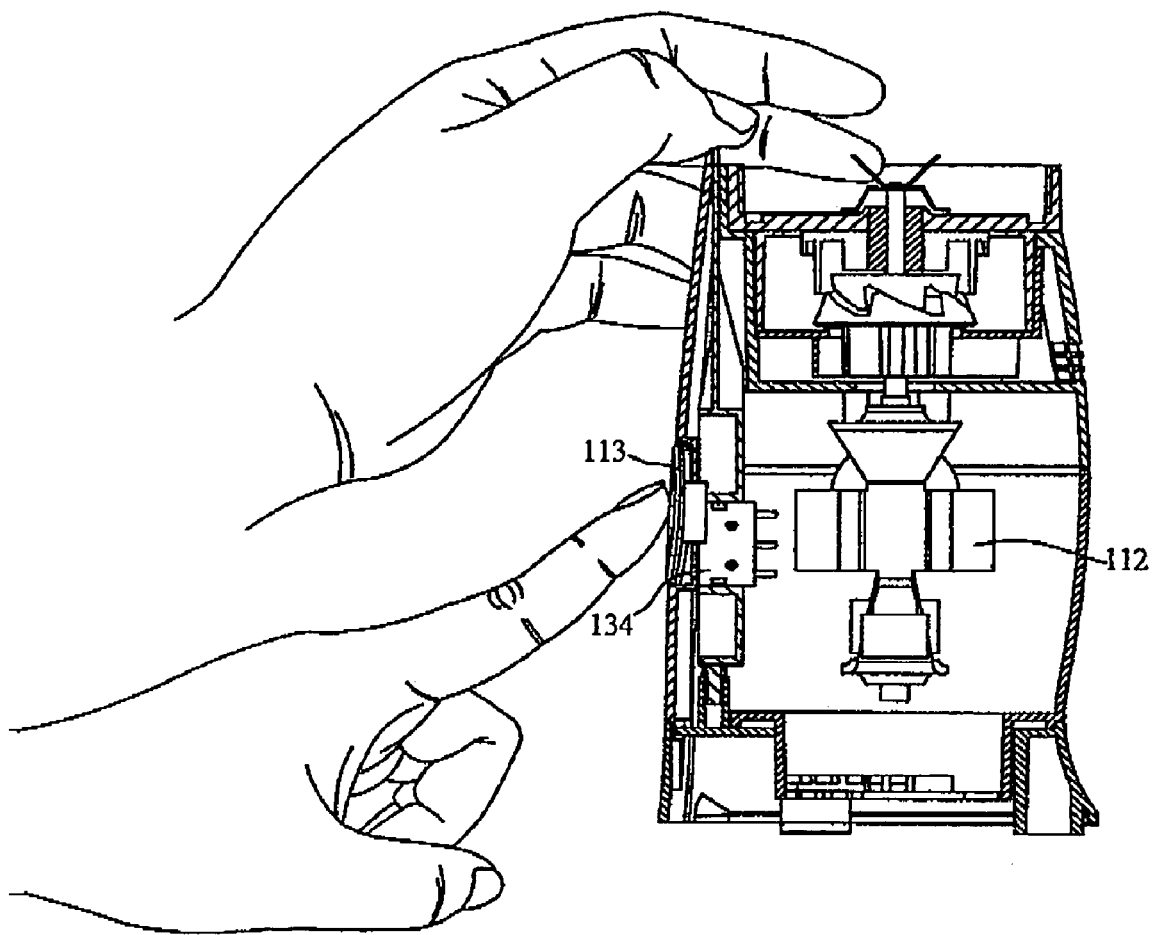
FIG. 4 is a schematic view showing the accidental depressing of the pressing rod of the conventional juice extractor.
Figure 5:
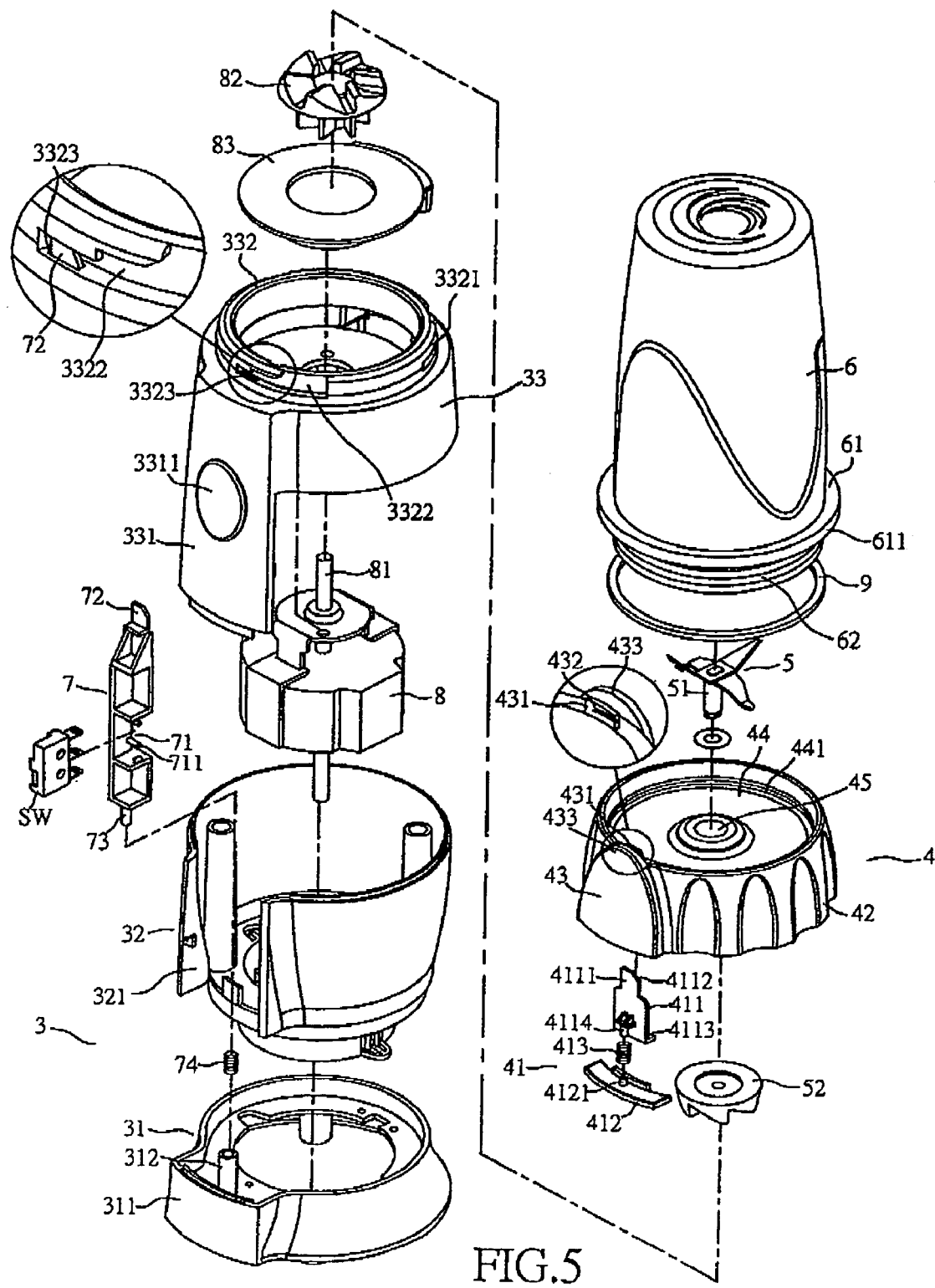
FIG. 5 is a perspective exploded view of a juice extractor of the present invention.

Referring to FIG. 5, there is shown a juice extractor comprising an extractor body 3, a cup seat 4, a blade seat 5, a cup body 6, a connection shaft 7, and a motor 8. The extractor body 3 includes a base seat 31, a holding seat 32 and a top holding seat 33. The base seat 31 is circular in shape having one lateral side extended to form a holding platform 311. The holding platform 311 holds the connection shaft 7, and a holding post 312 is extended from the holding platform 311. The holding post 312 has a slot for the insertion of a support post 73 of the connection shaft 7. The upper end of the base seat 31 is tightened with securing nut to the holding seat 32. The power line (not drawn) is inserted at the bottom side of the base seat 31.

The holding seat 32 is a hollow body having the same side of the holding platform 311 and is provided with an open slot 321. The slot 321 is for the holding of the connection shaft 7 and the protruded rib 331 of the top holding seat 33, and the bottom end is secured to the base seat 31, and the top end is in combination with the top holding seat 33. The hollow section is used for holding the motor 8.

The top holding seat 33 is a rim body having an upper end connected to a protruded edge 332 having an inner edge to hold the cup seat 4. A plurality of L-shaped slots 3321 are provided on the recess slot 3322, and the through hole 3323 is for the insertion of the tongue plate 72 at the end section of the connection shaft 7. The recess slot 3322 is used to hold the protruded block 431 of the cup seat 4. One side of the top holding seat 33 is extended to a protruded rib 331 having one side being a depress switch 3311. The press switch 3311 is used to control the operation or off of the motor 8. The inner side of the protruded rib 331 is for the holding of the connection shaft 7, and the bottom end of the top holding seat 33 is screwed to the motor 8. The lower side of the top holding seat 33 is screwed to the top end of the holding seat 32 with screw.

The connection shaft 7 has a slot 71 at the center thereof, and a securing post 711 is extended from the slot 71. The securing post 711 secures the micro switch SW to the slot 71. The top end of the connection shaft 7 is a tongue plate 72 which passes through the through hole 3323 to the recess slot 3322. The bottom end of the connection shaft 7 is a support post 73 having a spring 74 at the surrounding of the post 73. The support post 73 is mounted to the holding post 312 of the base seat 31. By using the tongue plate 72 at the top end of the connection shaft 7 passing through the through hole 3323, and the support post 73 being secured to the holding post 312, the connection shaft 7 is positioned at the inner side of the protruded rib 331. By using the spring 74 the connection shaft 7 can move forward and backward, and at the same time, the micro switch SW is driven to move up and down.

The motor 8 is positioned at the bottom end of the top holding seat 33. The shaft 81 of the motor 8 is mounted with a connection 82, and in between the connection 82 and the motor 8, a motor cover 83 is provided. The connection 82 and the connection 52 of the blade are engageable. When the motor 8 is in operation, the blade 5 will rotate to chop edible stuff.

The cup seat 4 is a hollow body and has threads 411 at the inner side of the rim wall 42. The inner side of the rim wall 42 is also threaded, and is used to connect with connection member 62 at the cup body 6, and the thread 441 of the rim wall 42 is screwed to the blade seat 5. The circumferential edge at the lower portion of the cup body 4 is provided with protruded blocks 431, and the number of protruded blocks 431 equals to the number of recess 3321. The cup seat 4 and the blade seat 5 are connected and are then formed into the bottom cover of the cup body 6 such that the cup body 6 is a sealed-like structure.

The blade seat 5 is a conic body and the external edge is provided with threads 51, and the blade seat 5 is screwed to the threads 51 of the cup seat 4. The blade seat 5 has a hole 52 for the insertion of the blade 53. The lower section of the blade 53 is a connector 54 for connection with another connector 82 of the motor 8, and is driven by the motor 8. A sealing rim P is provided between the cup body 4 and the blade seat 5.

The cup body 5 is a cylindrical body having an upper end mounted with a top cover 61, and the bottom end of the cup body is a circular member 62 with threads, which is mounted to the cup seat 4. A sealing rim 9 is positioned between the cup body 6 and the cup seat 4 so as to prevent juice leakage.

The cup seat 4 is a circular body and the lower ring of the cup seat 4 is a rim wall 42. The area defined by the rim wall 42 is exactly corresponding to the size of the protruded edge 332 of the top holding seat 33, and the inner edge of the rim wall 42 is provided with threads. The threads are corresponding to the threads 3321 of the protruded edge 332 and the cup seat 4 is screwed to the protruded edge 332 of the top holding seat 33. The top end of the cup seat 4 has a slot 44, and the edge of the top end of the slot 44 is provided with threads, and the threads can be screwed to the threads 631 at the top end of the cup body 6. The center region of the slot 44 is a shaft hole 45, and the shaft hole 45 allows the shaft 51 of the blade 5 to be inserted. The rim wall of the cup seat 4 corresponding to the top holding seat 33 is provided with a holding rib 43. The holding rib 43 is provided with a triggering member 41. The triggering member 41 includes a triggering plate 411, a bottom cover 412 and a spring 413. The edge at the top end of the holding rib 43 has a through hole 432. The through hole 432 allows the tongue plate 4111 of the top end of the triggering plate 411 to pass through. The corresponding position of the edge 433 of the top end of the holding rib 43 and the edge of the top end of the cup seat 4 has a protruded wall 431 to cause the tongue plate 4111 of the triggering plate 411 of the triggering plate 41 is positioned between the edge 433 of the top end of the holding rib 43 and the protruded wall 431. The triggering plate 411 of the triggering member 41 is an L-shaped plate body, and the vertical upward extension of the L-shaped plate body has a tongue plate 4111, and one side of the tongue plate 4111 has a sloping angle 4112. The tongue plate 4111 passes through the through hole 432 of the holding rib 43. The triggering plate 411 is covered within the holding rib 43 by a bottom cover 4112, and the bottom end of the triggering plate 411 towards the hole 45 of the cup seat 4 is provided with the triggering section 4113. The triggering section 4113 on the cup seat 4 is connected to the top holding seat 33 is exactly positioned on the slot 3322 of the top holding seat 33. The opposite side of the triggering section 4113 is provided with a protruded position 4114, and the bottom cover 412 is upward extended to form a protruded post 4121. The protruded post 4114 and the protruded post 4121 are corresponding to each other, and a spring 413 is positioned between the protruded post 4114 and the protruded post 4121. By using the spring 413, the triggering plate 411 moves up and down.

The bottom end of the blade 5 has a shaft 51 and the shaft 51 can pass through the shaft hole 45 of the cup seat 4. The end section of the shaft 51 has a connector 52, and the blade 5 is rotated by means of the connector 52 and the connector 82 of the motor 8.

The cup body 6 is a cylindrical body and has a rim plate 61 at the upper end thereof. The rim plate 61 is downwardly extended to form a rim wall 611. The rim wall 611 is placed between the protruded wall 431 of the cup seat 4 and the top end edge 433 of the holding rib 43 when the cup body 6 is screwed to the cup seat 4. The edge at the open end of the cup body 6 is provided with the threads 62. The cup body 6 with threads 441 of the cup seat 4 and threads 62 is screwed to the cup seat 4. In order to avoid juice leakage between the cup body 6 and the cup seat 4, and a sealing rim 9 is positioned between the cup body 6 and the cup seat 4 so as to prevent juice leakage.

Figure 6:
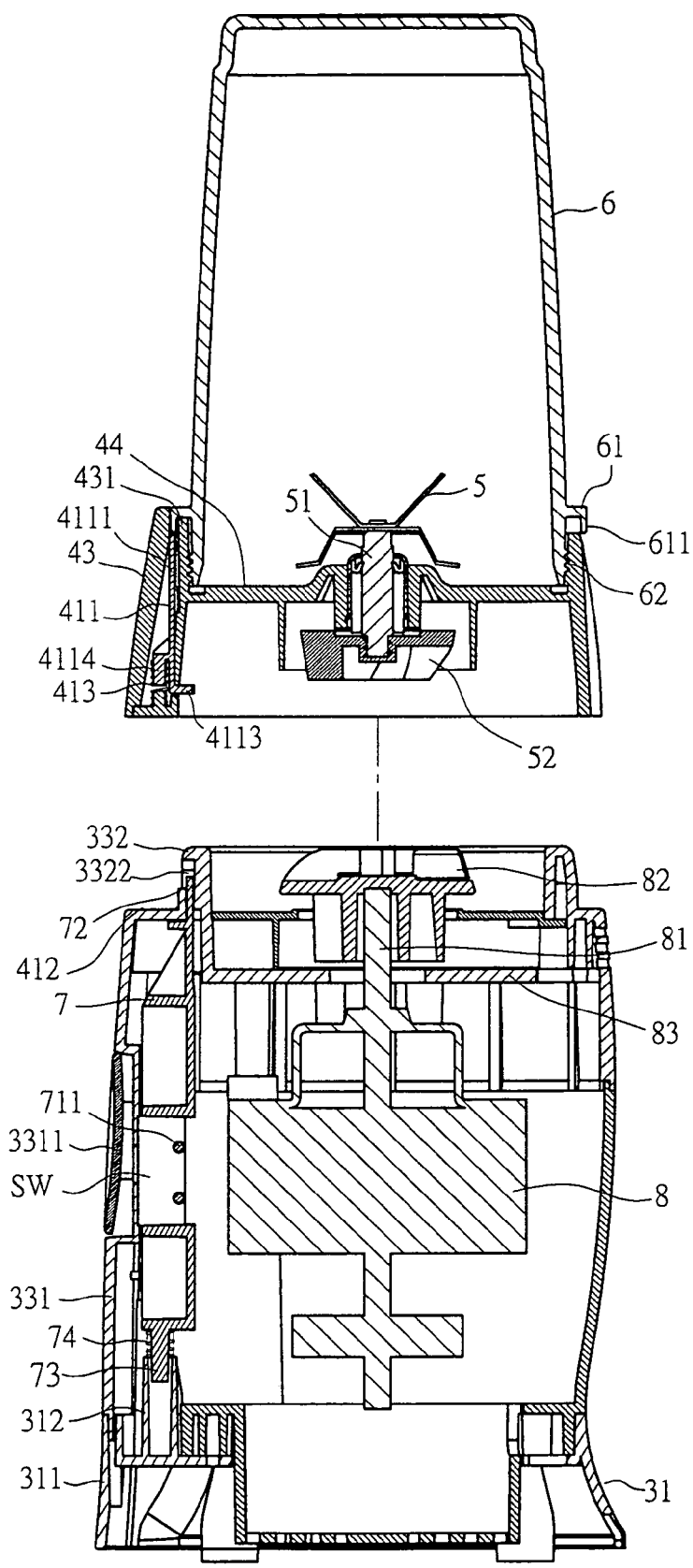
FIGS. 6 to 7 schematically show the action of the juice extractor of the present invention.
Figure 7:
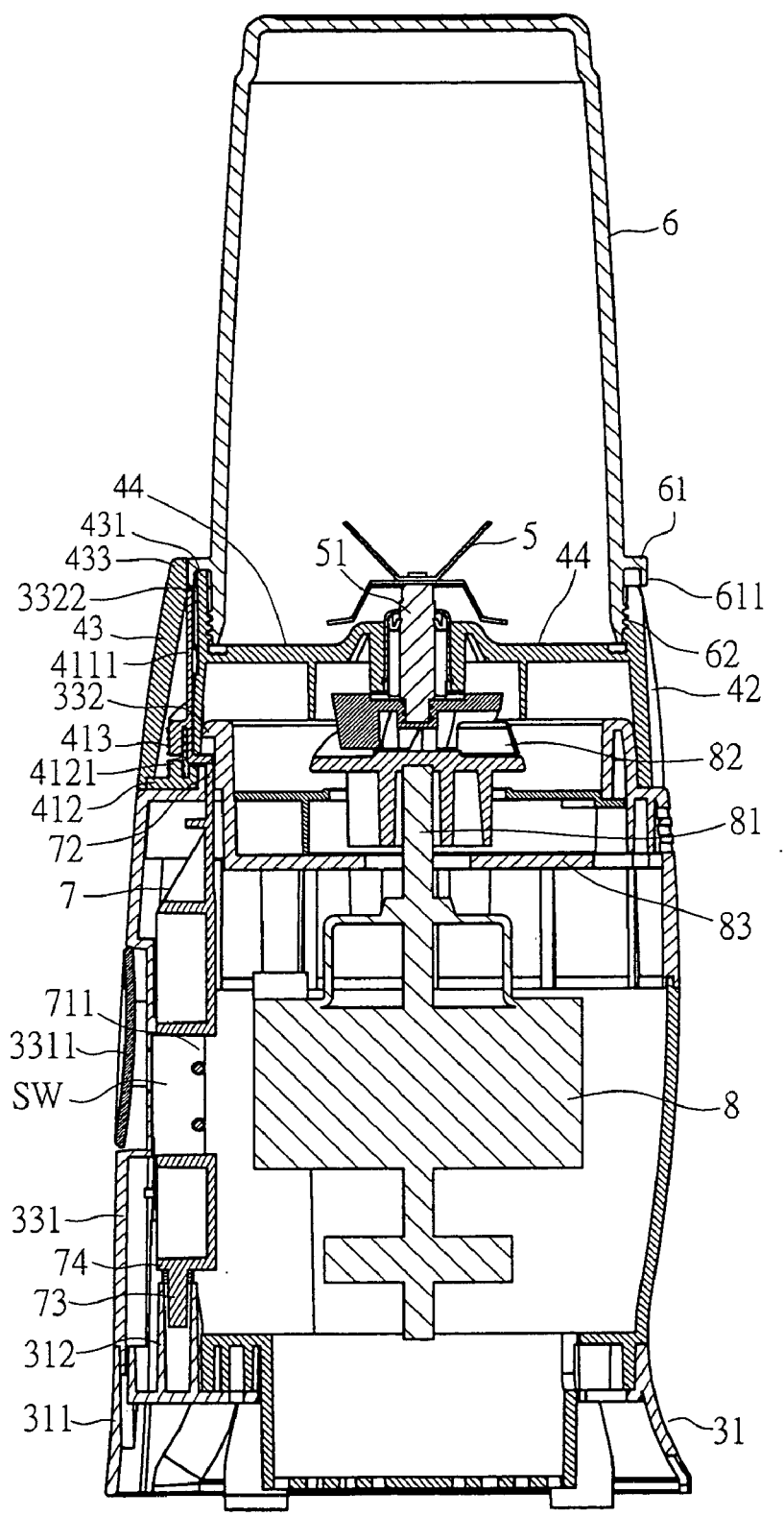

Referring to FIGS. 6 and 7, the motor 8 and the connection shaft 7 are mounted onto the top holding seat 33, and the top holding seat 33 and the bottom seat 31 are respectively secured to the top and bottom end of the holding seat 32 to form a complete extractor body 3.

When vegetable and fruits are placed within the cup body 6, and the cup seat 4 is screwed to the opening of the cup body 6 so that the cup body 6 forms into a container. The bottom end of the cup body 4 is screwed to the protruded edge 332 at the top end of the top holding seat 33 of the extractor body 3, and the press switch 3311 is depressed, then the motor 8 is operated to drive the blade 5 to extract juice.

When the cup body 6 is screwed to the cup seat 4, the rim wall 611 is exactly positioned between the holding rib 43 and the protruded wall 431. When the rim wall 611 of the cup body 6 is positioned to the cup seat 4. The rim wall 611 of the cup body 6 can depress the triggering plate 411 of the actuating member 41 of the cup seat 4. When the cup seat 4 is screwed to the top holding seat 33 of the extractor body 3, and the triggering plate 411 is exactly positioned at the slot 3322 of the rim structure of the top holding seat 33. When the cup seat 4 is screwed to the top holding seat 33, the triggering section 4113 touches the tongue plate 72 of the connection shaft 7 which causes the downward movement of the connection shaft 7, and the micro switch SW is moved to the press switch 3311 which can be triggered. At this instance, the juice extractor is at power on condition, and the depression of the press switch 3311 can trigger the motor 8 to drive the blade 5. This will extract juice from the chopped vegetable and fruits.

Figure 8:
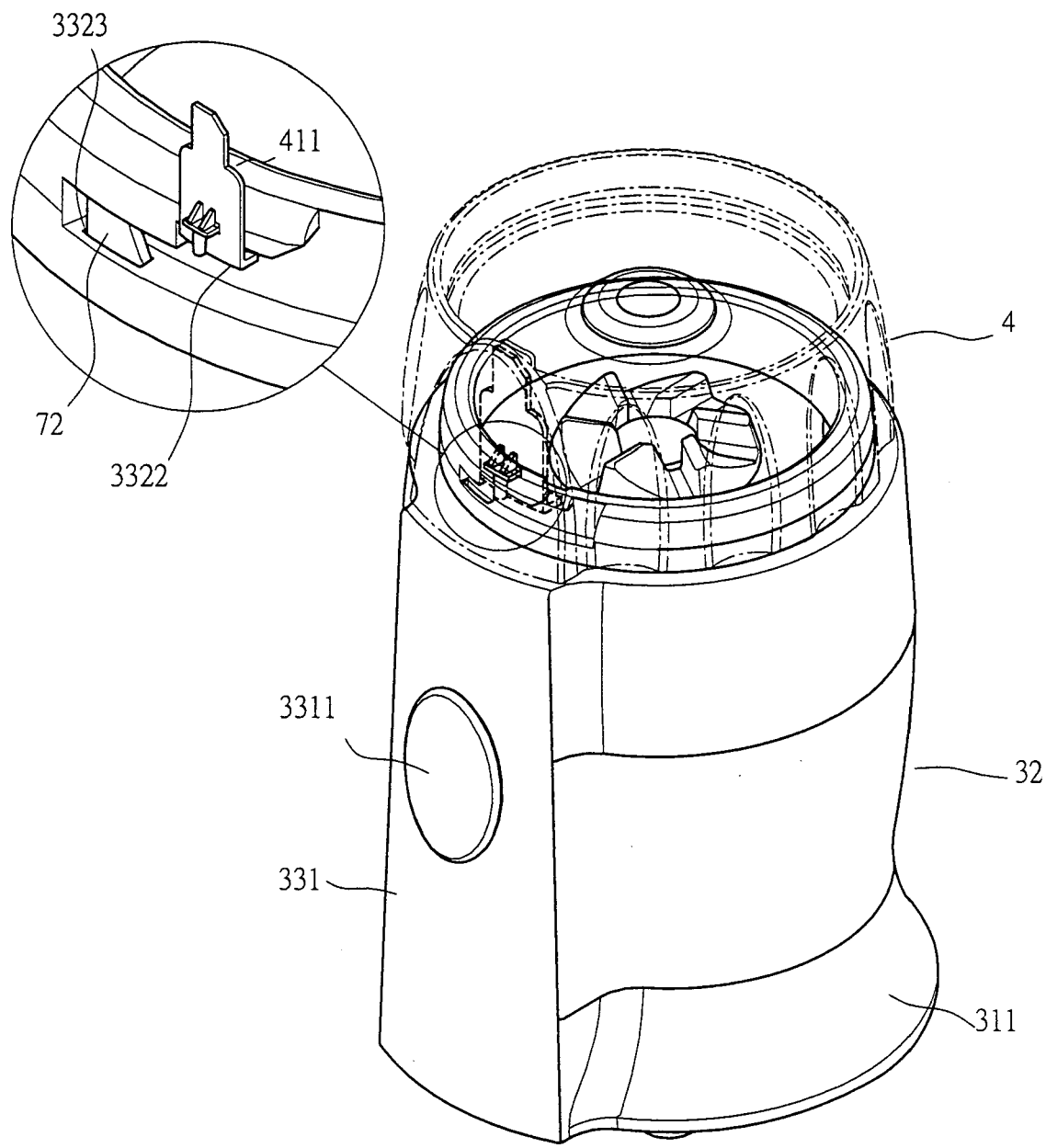
FIG. 8 is a schematic view of the application of the present invention.

After the cup body 6 is screwed to the cup seat 4 and the triggering section 4113 is depressed, the triggering section 4113 slides into the bottom section of the slot 3322 which will depress the connection shaft 7. If the cup seat 4 has not screwed to the cup body 6 but is directly screwed to the top holding seat 33, the triggering section 4113 of the cup seat 4 will be blocked at the front end of the slot 3322. As shown in FIG. 8, if the connection shaft 7 cannot be depressed, the juice extractor cannot be operated. Thus, the safety of the juice extractor is improved.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A safety device of a juice extractor comprising an extractor body, a motor, a cup seat having a holding rib at one side of the cup seat and the holding rib containing a triggering member, and a bottom end of the cup seat being screwed to a top holding seat and the bottom end of the cup seat screwed to a cup body, wherein a protruded edge of the top holding seat has a slot to connect the cup body to the cup seat, and is then connected to the top holding seat, then the triggering member mounted at the cup seat can slide at a bottom section of the slot so as to depress a connection shaft, thereby safety of the juice extractor is improved.

2. The safety device of claim 1, wherein the triggering member includes a triggering plate, a spring and a bottom cover.

* * * * *